United States Patent
Vieregge (12)

(10) Patent No.: US 6,499,769 B1
(45) Date of Patent: Dec. 31, 2002

(54) METHOD AND DEVICE FOR CONNECTING A FIRST TUBE TO A TUBULAR ELEMENT, AND CONNECTION BETWEEN A FIRST TUBE AND A TUBULAR ELEMENT

(76) Inventor: Uwe Vieregge, Kantstrasse 10, Grundau (DE), 63584

( * ) Notice: Subject to any disclaimer, the term of this patent is extended or adjusted under 35 U.S.C. 154(b) by 0 days.

(21) Appl. No.: 09/242,140
(22) PCT Filed: Aug. 6, 1997
(86) PCT No.: PCT/EP97/04293
§ 371 (c)(1),
(2), (4) Date: Feb. 25, 1999
(87) PCT Pub. No.: WO98/06518
PCT Pub. Date: Feb. 19, 1998

(30) Foreign Application Priority Data

Aug. 9, 1996 (DE) ...................................... 296 13 808 U
Nov. 1, 1996 (DE) ...................................... 296 18 262 U (51) Int. Cl.⁷ ................................................ F16L 41/00
(52) U.S. Cl. ........................... 285/197; 285/222; 72/125
(58) Field of Search .................................. 285/197, 162, 285/222, 285, 202, 382, 39; 72/112, 117, 125; 29/509–512, 515, 270, 272

(56) References Cited

FOREIGN PATENT DOCUMENTS

| DE | 9416506 | 5/1995 |
| FR | 2210270 | 7/1974 |
| FR | 2229010 | 12/1974 |

*Primary Examiner*—Suzanne Dino Barrett
(74) *Attorney, Agent, or Firm*—Bierman, Muserlian and Lucas (57) ABSTRACT

A device for connecting a first tube (10) with a connection tube (14) whose end segments (22, 24) extend through an opening (12) of the first tube and to establish in a simple manner, a force-fit connection between the tubes, a tool (34) is proposed which comprises at least two segments (36, 38) axially displaceable relative to the other and extending within the connection tube(14) up to or nearly into the first tube (10), with one of the segments (36) having a radially projecting protrusion (42) which engages the end segment (22, 24) with the segments disposed within the tube (10), and external to the projecting protrusion the segments have a total effective diameter which is adapted to the inner diameter of the connection tube (14) in the region of the opening (12) of the first tube (10).

10 Claims, 8 Drawing Sheets

METHOD AND DEVICE FOR CONNECTING A FIRST TUBE TO A TUBULAR ELEMENT, AND CONNECTION BETWEEN A FIRST TUBE AND A TUBULAR ELEMENT

The invention relates to a device for connecting a first tube with a tubular element such as a connection tube or segment of such, wherein the tubular element extends with its end segment into an opening of the first tube and, by means of a tool, can be connected force-fittingly with it. The invention further relates to a method for connecting a first tube with a tubular element.

The invention also refers to a connection between a first tube and a junction element such as a valve, sprinkler head or further tube, comprising a hollow cylindrical connecting element, extending through an opening of the first tube with at least one segment into it and sealed relative to it, such as a housing which is connectable with the connecting element or the further tube.

According to DE 94 16 506 U1 a corresponding connection comprises a connection element with self-cutting threads which can be screwed into the opening of the first tube and which is encompassed by a hollow cylindrical housing which has a sealing effect relative to the connection element as well as also relative to the tube. A segment of the connection element extends within the first tube such that its free cross section is reduced in this region. In addition, several elements are required in order to establish the desired fluid-and pressure-tight connection.

It is also known to establish a connection by means of a sprinkler clamping collar such as are disclosed in EP 0 332 500 B1 or DE 94 11 013 U1.

According to DE 94 11 979 U1 a tube branch is realized by structuring a planar surface of a wall of a first tube from which extends a second tube.

A connection between a tube and a junction can, according to U.S. Pat. No. 2,015,246, be established by means of welding.

In U.S. Pat. No. 5,207,461 a device of the type cited in the introduction is disclosed which comprises a piston-cylinder arrangement as well as a frame with support receiving the first tube. Extending from the piston is a piston rod with which a bar is detachably connected, which comprises at the end a hemispherical segment whose maximum diameter is smaller than that of the opening of the first tube. The tube connection piece itself which is connected with the first tube, comprises a fish-mouth shaped end segment with flanged margin which changes over into a groove resulting in a material weakening which groove, in turn, is limited by an outer shoulder of the tube connection piece whose outer diameter is greater than that of the opening. For the force-fit connection of the tube connection piece with the first tube, the bar with the hemispherical head is introduced with the end at the fish-mouth side into the tube connection piece in order to be connected with the piston rod. The tube connection piece is subsequently placed onto the opening of the first tube. Tailored to the length of the tube connection piece, arms of the frame are braced on its outer margin in order to pull subsequently by means of the piston-cylinder arrangement the bar with the hemispherical head in the direction of the tube connection piece whereby the flanged edge extending within the first tube is bent over in the direction of the first tube in order to establish the force-fit connection. After sufficient deformation the hemispherical head with the bar can be pulled out of the tube connection piece. A flat sealing gasket ring extends between the shoulder and the outer surface of the first tube to effect a sealing between the tube connection piece and the first tube.

The present invention, for one, is based on the problem of further developing a device and a method of the type cited in the introduction such that with simple measures and independently of a piston-cylinder arrangement, a secure connection between a first tube and a tubular element, such as a second tube or other tubular junction elements, such as sprinkler head, can take place, and it is intended to ensure that the branching is fluid- and pressure-tight. For another, through the invention the problem is to be solved of further developing a connection of the type cited in the introduction such that with the least possible number of elements in a simple manner a fluid-and pressure-tight branching is possible without clamping collars or geometric changes of the connecting tube being required.

According to the device, the problem is solved thereby that the tool comprises at least two segments, axially displaceable one with respect to the other and extending within the tubular element up into the opening, that one of the segments comprises a radially projecting protrusion which engages behind the end segment of the tubular element when the segments are disposed within the tubular element, wherein the segments comprise external to the projecting protrusion a total effective diameter which is adjusted to the inner cross section of the tubular element.

The segment comprising the projecting protrusion is axially displaceable at least relative to a further segment such that the end segment extending within the first tube of the tubular element is bendable in the direction toward the inner wall of the first tube.

Due to the device according to the invention a force-fit connection of the tubular element with the opening of the first tube is possible with simple measures. For this purpose it is only required that the segment of the tool with a radially projecting protrusion is initially shifted from the outside through the tubular element into the interior of the first tube in order to displace subsequently the one or the further segments axially into the region of the opening wherein the total effective cross section of the segments extending within the opening corresponding approximately to the inner diameter of the tubular element. This ensures that when by means of the projecting protrusion of the first segment the margin segment, extending within the first tube, of the tubular element is bent in the direction toward the inner wall of the first tube, a lateral yielding of the segment cannot take place so that axial forces alone must act onto the segment effecting the bending or flanging.

It is simultaneously ensured that the tubular element is not exposed to uncontrolled forces which can lead to impermissible deformation.

The invention provides, in particular, that the tool comprises two segments, axially extending within the opening of the first tube and rotatable within the opening, that the first segment having the projecting protrusion comprises a cylinder-form basic body and the second segment has a sickle-form in cross section whose concave surface in the contact region with the first segment is adapted to its outer geometry.

In other words, the first and second segments which are axially displaceable one relative to the other, have a total cross section which corresponds approximately to a circle form, whereby is possible the good adaptation to the inner cross section of the tubular element to be connected with the first tube.

The projecting protrusion itself comprises preferably a cylinder form with an underside extending obliquely in the direction of the basic body, with the angle of inclination laid out such that the surface contact of the end segment to be bent over of the tubular element on the inner wall of the first tube becomes possible.

The protrusion should further extend flush from that region of the outer surface which is displaceable along the second segment.

The bending over or flanging of the end segment extending within the first tube takes place peripherally thereby that the tool is rotatable successively about its longitudinal axis.

According to the method, the problem for the force-fit connection of the tubular element with the opening of the first tube is solved thereby that the tubular element is introduced with its end segment into the opening of the first tube, that through the tubular element a first segment of the tool with a radially projecting protrusion is introduced into the interior of the first tube such that the protrusion extends between the external free edge of the tubular element and the inner wall opposite the opening of the first tube, that axially along the first segment a second segment is shifted up into the opening region of the first tube wherein the first and the second segment in the region of the opening has a total effective cross section adapted to the inner cross section of the tubular element, that the first segment is shifted in the direction of the opening along the second segment while simultaneously the margin segment of the tubular element extending within the first tube is bent, that the first segment subsequently is shifted in the direction of the tube interior and rotated about its longitudinal axis in order to bend over subsequently, in a previously described manner, further regions of the end segment of the tubular element and, consequently, to connect them force-fittingly with the margin of the opening of the first tube.

After the end segment of the tubular element has been bent or flanged to the required extent, first, the second segment and subsequently the first segment are removed from the tubular element.

The pressure-and fluid-tight connection between the tubular element and the first tube takes place thereby that the tubular element on the outside of the tube comprises a preferably encircling reception for a sealing element such as an O-ring.

A connection of the type described in the introduction is distinguished thereby that the segment, or segments, extending on the inside along the first tube are pressed over, flanged or compressed. In particular, it is provided that the connection element having a hollow cylinder form comprises on the outside of the tube a reception, preferably encircling, for a sealing element, such as an O-ring.

A connection between a first tube and a junction element, such as a valve, sprinkler head or a further tube, comprising a hollow cylindrical connection element connectable with the junction element or the further tube, such as a housing, which is sealed relative to the first tube and extends with a segment within an opening of the first tube, is also distinguished thereby that the segment of the connection element is connected with the first tube through welding processes, with the hollow cylindrical segment of the connection element, adapted at the circumferential side of the opening of the first tube comprises protrusions forming dot-form contact sites which are welded to the first tube, in particular with the margin encompassing the opening and/or the hollow cylindrical segment of the connection element comprises a recess, adapted to the cross sectional geometry of the tube, which is welded to the margin-side region of the opening.

Due to the teaching according to the invention it is only required to place the connection element, such as a housing, with its segment into the opening of the first tube and subsequently, by applying electrodes, to weld the segment to the first tube and specifically in particular with the margin region of the opening so that the required force fit between the connection elements, such as a housing, and the first tube is ensured.

The recess of the hollow cylindrical segment is preferably such as to be encircling and comprises an annular step, adapted to the outer geometry of the tube, which can be welded to the first tube, preferably to the inner margin of the opening.

The teaching according to the invention opens the possibility of establishing with simple measures a fluid-and pressure-tight connection between the connection element, such as a housing, which is connectable with the junction element or a further tube, and the first tube, with—in contrast to previously known prior art—the cross section of the first tube in the region of the connection element not needing to be decreased. Rather, the possibility exists that the segment extends at the front wall flush or nearly flush with the opening-side inner walls of the first tube and runs offset toward the inside.

In order to permit the simple placement of the connection element into the opening of the first tube and/or to make available simultaneously a contact surface conducting the welding current to the required extent between the connection element and the first tube, the opening can be chamfered at the outside wall at least in regions, with the recess of the segment, extending into the opening, of the connection element having a congruent geometry.

The connection element itself having a hollow cylindrical form should comprise on the outside of the tube a reception, preferably encircling, for a sealing element-such as an O-ring-in order to ensure the required sealing between the elements.

Further details, advantages and characteristics of the invention are evident not only in the claims, the characteristics listed in them—by themselves and/or in combination—but also in the following description of preferred embodiment examples depicted in the drawing.

Therein depict.

In order to connect a first tube 10 with a junction element, such as a sprinkler head, valve, measuring element or a further tube, in a tube 10 an opening 12 is provided into which a tubular element 14, which can be denoted as a hollow cylinder connection element, can be placed and which, via a sealing 18, set into a reception 16, structured at least in regions in the form of a groove extending on the outside along tube 10, in the form of an O-ring is sealed relative to the tube 10.

In order to ensure a pressure-tight and fluid-tight connection between the connection element 14 and the tube 10, a force-fit connection is established thereby that into the interior 20 of the tube 10 extend a margin segment or segments 22, 24 of the connection element 14, which in the embodiment example are flanged in the axial direction of tube 10. Hereby the inner segments 22, 24 come to lie in contact on the inner wall 26 of the tube 10 whereby the segment 28 extending outside of tube 10 is pulled in the direction of tube 10 in order to ensure the requisite force-fit connection and the necessary sealing via the O-ring 18.

Viewed in the radial direction of tube 10, it is not required that the connection element 14 extends into the interior space. Rather, the particular inner margin region 28, 30 can change over flush or nearly flush into the inner wall 26 of the tube. However, it is understood, that an encompassing margin region of the connection element 14 can be flanged or bent.

In order to connect the connection element 14 via the segments 22, 24 force-fittingly with tube 10 by bending or flanging of segments 22, 24, via the connection element 14, thus its opening 32 leading to the inner space 20 of the tube 10, a unitary or multipart tool can be introduced in order to press over, to press together or to bend the segments 22, 24 in another suitable manner such that these come to rest in contact on the inner wall 26 of tube 10.

A corresponding tool and its operational function is evident in FIGS. 6 to 10. The tool 34 depicted purely in principle, comprises two segments 36, 38, axially displaceable one relative to the other, of which segment 36, under the guidance of a reception 40, depicted as cylindrical, is received, which is formed integrally with segment 38.

The first segment 36 comprises at the end side a radially projecting cylindrical protrusion 42 which extends obliquely on the under side in the direction of a base segment 44 of segment 36, thus, in the direction of the reception 40, has in some regions the geometry of a truncated cone. The corresponding geometry of underside 46 is in particular evident in FIGS. 8, 9 and 10.

The base segment 44 changes over into a cylindrical segment 48 having a greater diameter, which is displaceable within reception 40. The first segment 36 consequently has a geometry which corresponds to a shaft with projecting cams.

The second segment 38 is displaceable along the outside of the first segment 36 in a region 50 which, facing away, extends to the radially projecting protrusion 42. Since the first segment 36 in the region 50 conforms to the circumferential surface of a cylinder, consequently the second segment 38 has a sickle-form geometry whose concave inner surface is adapted to the outer surface of segment 36.

The axial displacement of segments 36, 38 can take place with suitable means, without discussing these any further.

In order to bend or flange the margin segment 22, 24 of the tubular element 16, projecting into the interior of the first tube 10, with the aid of tool 34, in order to obtain to the desired extent a force-fit connection, according to the method the following steps are carried out:

First, the element 14 is placed into the opening 12 of tube 10 such that the former extends with the outer margin region 22, 24 in the interior 20 of tube 10.

Figure 8:
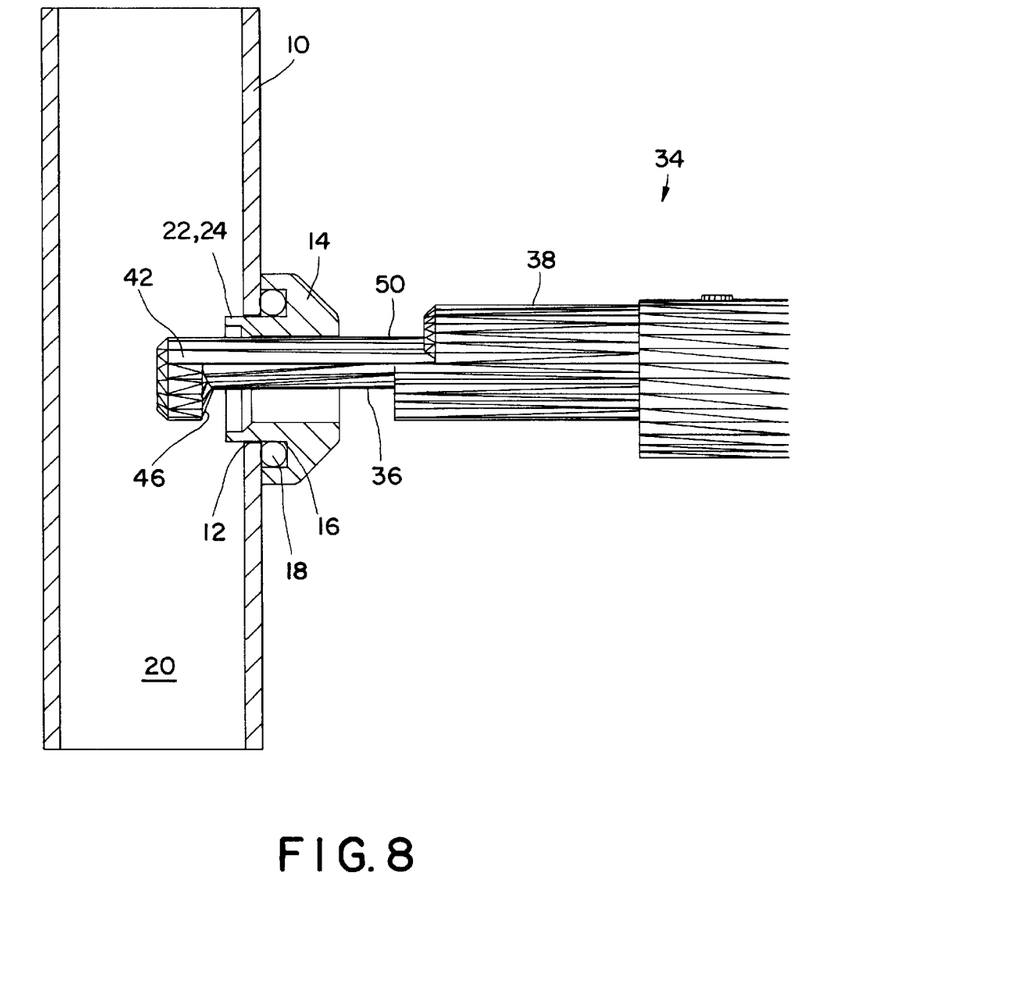

The encircling recess 16 of element 14 is subsequently in contact on the outer wall of tube 10. The tool 34 is subsequently oriented to the opening 12 and the first segment 36 comprising the radially projecting protrusion 42 is slid through element 14 and opening 12 into the interior 20 of tube 10 and specifically to an extent such that the protrusion 42 with its underside 46 extends between the margin region 22, 24 and opposing wall of tube 10. This method step is depicted in FIG. 8.

Figure 9:
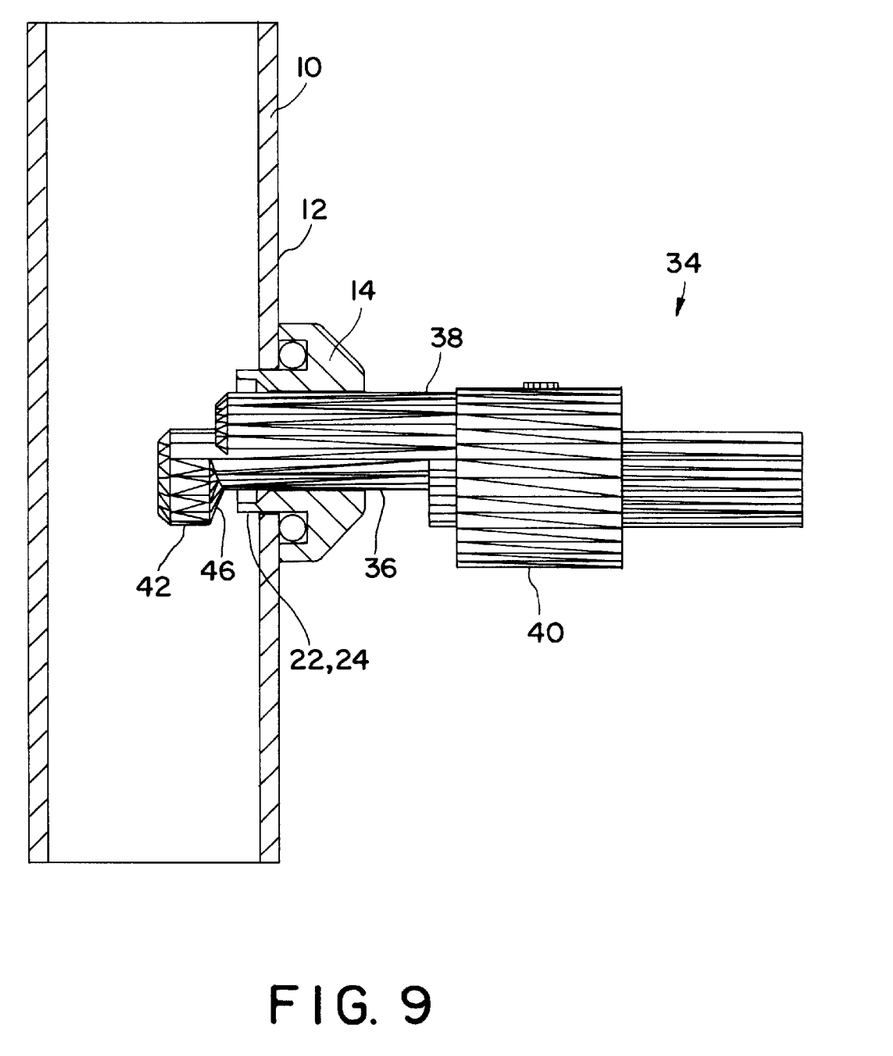

Subsequently the segment 38 associated with the first segment 36 is displaced axially along the outer wall region 50 of the first segment 36, with the axial displacement of the tool 34 occurring simultaneously to an extent that within the tubular element 14 and opening 12 of the tube 10 extend the first as well as also the second segment 36, 38 of tool 34 (FIG. 9).

Figure 10:
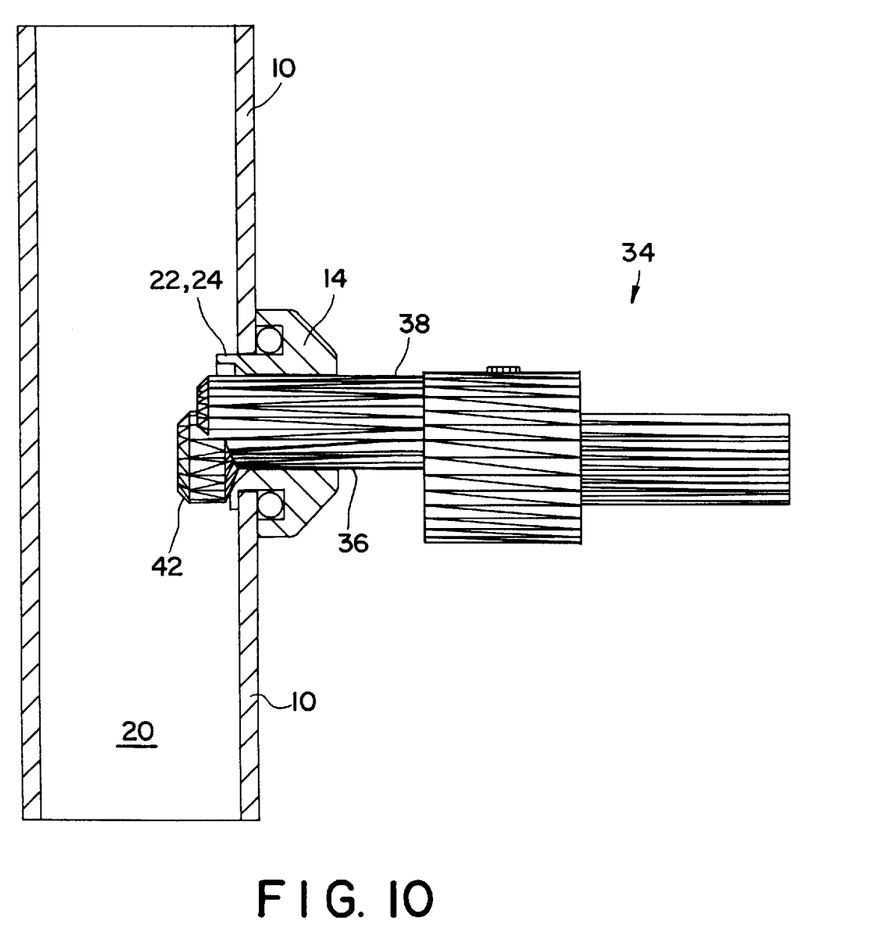
Figure 11:
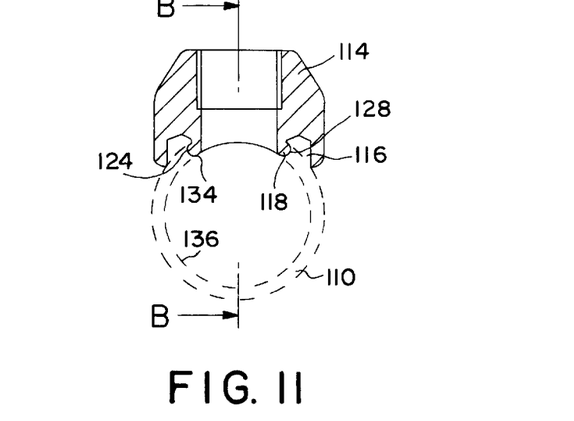
Figure 12:
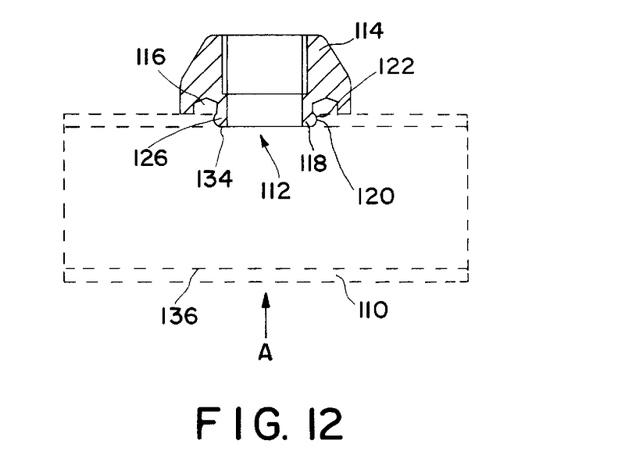
Figure 13:
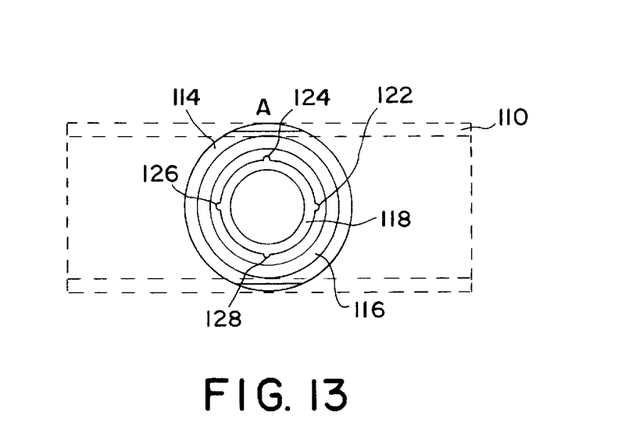
Figure 14:
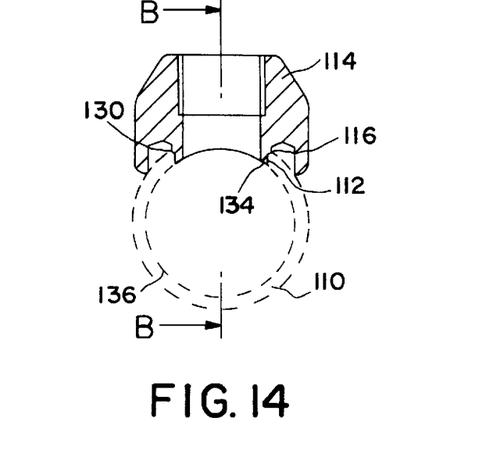
Figure 15:
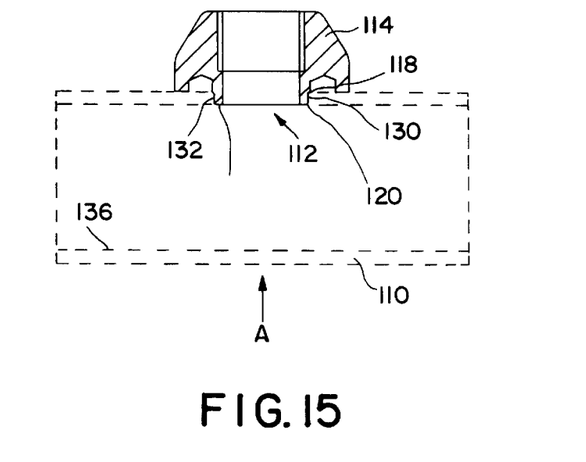
Figure 16:
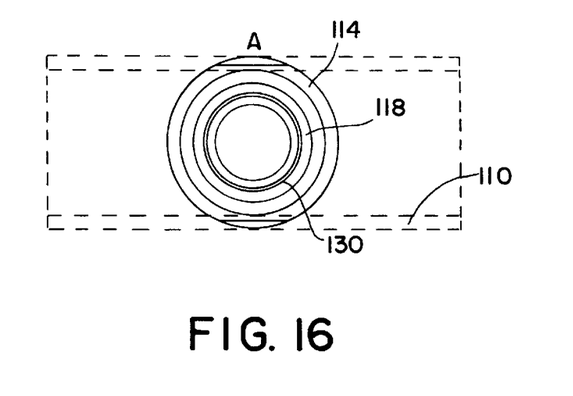

The effective outer diameter of the first and second segments 36, 38 extending within opening 12 in the tubular element 12 is adapted to the inner diameter of the tubular element 14 within the opening 12 in order to be able to exclude largely a radial relative movement. Subsequently, the first segment 36 comprising the radially projecting protrusion 42 is pulled back in the direction of opening 12 relative to the second segment 38 whereby the margin or the segments 22, 24 of the tubular segment [SIC: element] 14 slides along the underside 46, conforming in segments to a truncated cone geometry, and are bent in order to come to rest in contact on the inner wall of tube 10 (FIG. 10). Subsequently, the first segment 36 is again displaced into the interior 20 of the tube 10, the tool 34 is rotated in order to bend in the previously described manner another segment of the margin region 22, 24 extending within the tube 10.

After the tubular element 14 to the required extent by bending the segment within tube 10 is force-fittingly connected to it, the second segment 38 is pulled back from the tubular element 36 in order subsequently, after the radial displacement of tool 34, to pull out the first segment 36 with the radially projecting head 42.

In FIGS. 11 to 16 are depicted further embodiments of connections between a first tube with a second tube or tubular junction element.

In the embodiment examples described in the following identical elements are provided with identical reference symbols.

In order to connect a first tube 110 with a junction element, such as a sprinkler head, valve, measuring element or a further tube, the tube 110 comprises an opening 112 into which a hollow cylindrical connection element or housing 114 is placed. In a reception 116, at least structured in regions as a groove, a seal can be placed in the form, for example, of an O-ring in order to seal the housing 114 against the tube 110 to the required extent. For reasons of clarity the corresponding sealing element is not represented.

Figure 1:
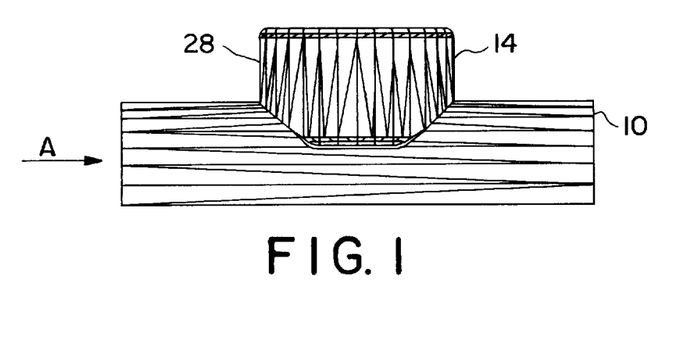
FIG. 1 a side view of a tube shown partially with a tubular element connected with it, FIG. 2 the tube with the tubular element depicted in direction A of FIG. 1, FIG. 3 the tube and the tubular element according to FIG. 1 and FIG. 2 seen from below, FIG. 4 a longitudinal section through a tube with a tubular element before it is force-fittingly connected with the tube, FIG. 5 a section along line V—V in FIG. 4, FIG. 6 a perspective representation of a tool for the force-fit connection of a first tube with a tubular element, FIG. 7 a further perspective representation of the tool according to FIG. 6, FIG. 8 to 10 various positions of the tool according to the FIGS. 6 and 7 for the force-fit connection of the tubular element with the tube, FIG. 11 a cross section through a first tube with a connection element connected force-fittingly with it, FIG. 12 a section along the line B—B in FIG. 11, FIG. 13 a representation of the tube with a connection element connected with it in direction A according to FIG. 12, FIG. 14 a cross section of a first tube with a connection element corresponding to a second embodiment, FIG. 15 a section along the line B—B in FIG. 14, and FIG. 16 a view of the first tube with a connection element connected with it in direction A according to FIG. 15.
Figure 2:
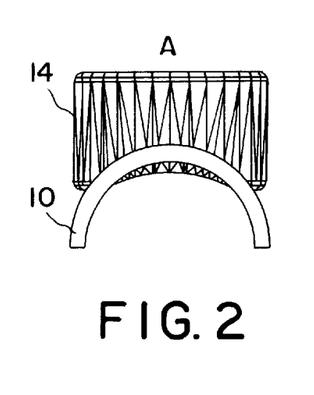
Figure 3:
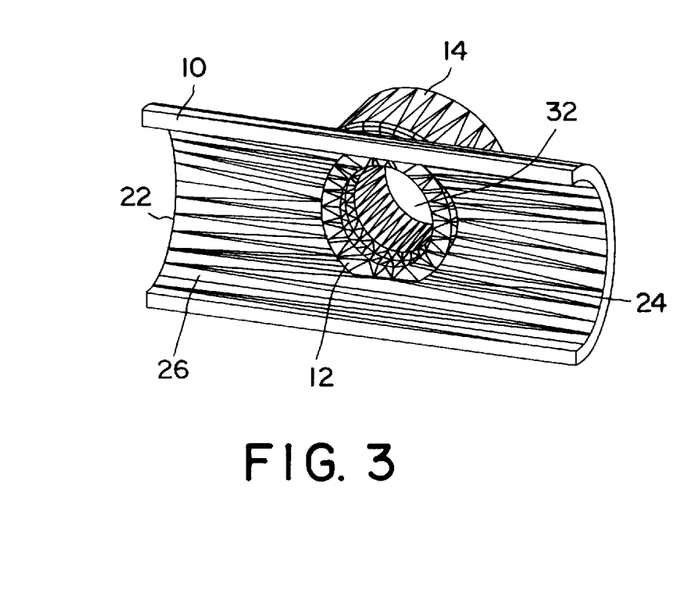
Figure 4:
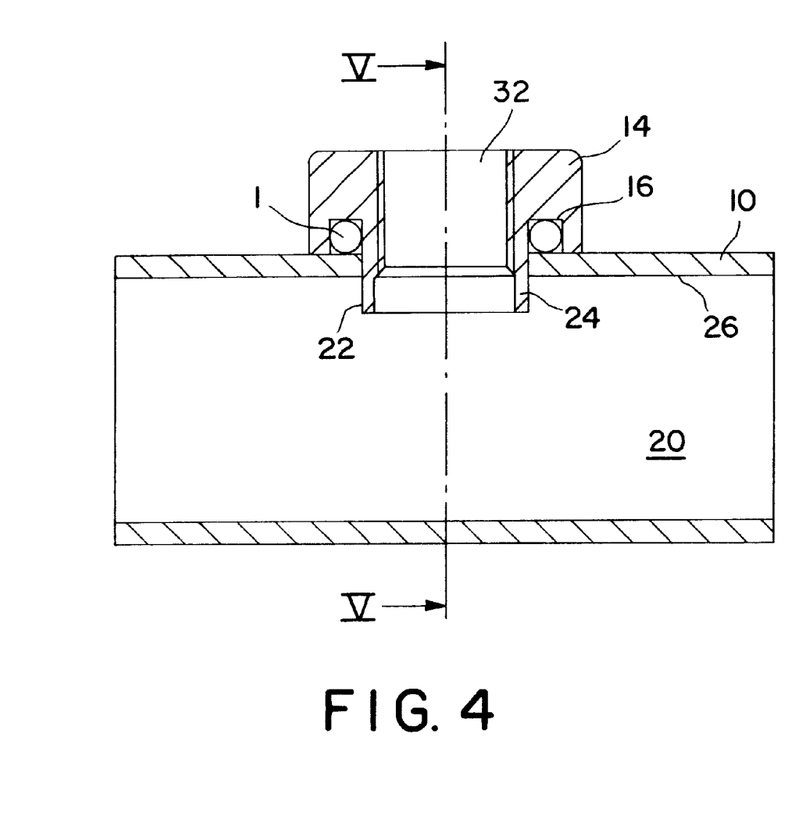
Figure 5:
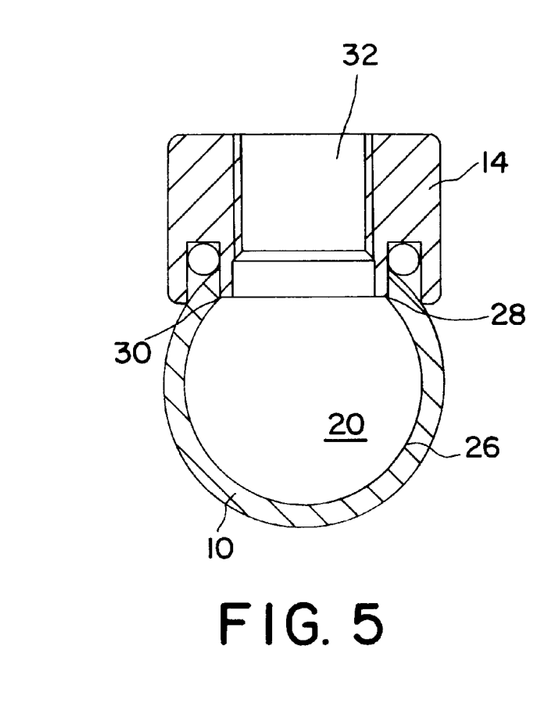
Figure 6:
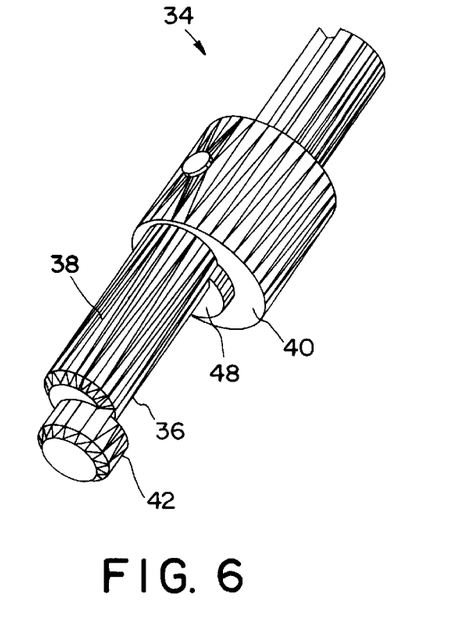
Figure 7:
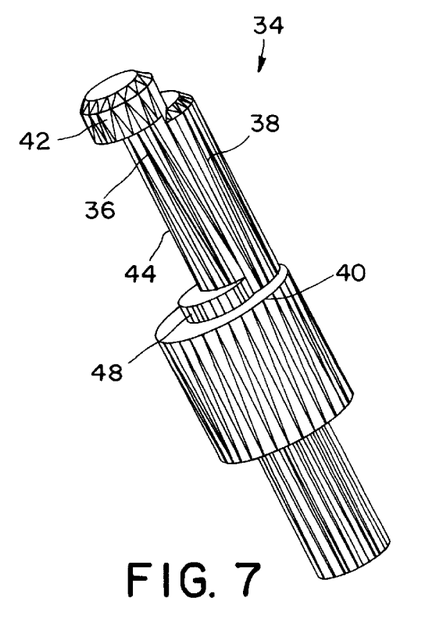

In order to ensure a pressure-and fluid-tight connection between the connection element 114 and the tube 110, the housing 14 [SIC: 114] is welded to pipe 110, with a segment 118 extending within the opening 112. The segment 118 extends within the margin 20 of opening 112 and, according to the embodiment example of FIGS. 1 to 3, can be welded via protrusions 122, 124, 126, 128 forming dot-form contact sites to the margin 120 of opening 112.

In the embodiment example of FIGS. 11 to 16 the segment 118 comprises a step form recess 130 which preferably rests in contact on a chamfered segment 132 of the inner margin 120 of opening 112 and is welded in this region to the first pipe 110. The welding can take place on the inner margin 120 of opening 112 as well as also on the outer wall on the first tube 110 in the region encompassing the opening 112.

For welding the connection element 114 to the tube 110, it is only required to place the electrodes required for welding onto the tube 110 or the segment 118 or the housing 114 in such a way that a welding takes place in the margin region of opening 112 of tube 110 in order to establish n this way the requisite force-fit connection.

As is illustrated further by the sectional representations of FIGS. 11 to 16, the segment 118 of the connection element 114 extends with its margin 134, facing the interior of the tube, flush relative to the inner wall 136 of tube 110 so that consequently through the connection element 114 no cross section decrease of the tube 110 is brought about.

What is claimed is:

1. A device (34) for connecting a first tube (10) with a tubular element (14) or a segment thereof, with the tubular element penetrating with an end segment (22, 24) into an opening (12) of the first tube and is connected force-fittingly by means of the device wherein the device (34) comprises at least two segments (36, 38), axially displaceable one relative to the other and extending within the tubular element (14) up to or nearly into the first tube (10), that one of the segments (36) comprises a radially projecting protrusion (42) which engages behind the end segments (22, 24) with the segments disposed within the tube (10), with the first segment having a first cross section and the second segment having a second cross section, each differing from the cross section of the beginning of the first tube (10) and said first cross section and second cross section building a total effective cross section outside of the projecting protrusion corresponding to the inner cross section of the tubular element (14) in the region of the opening of the first tube.

2. A device of claim 1 wherein the segment (36) comprising the projecting protrusion (42) axially displaceable relative to at least one further segment (38) so that the end segment (22, 24), extending within the first tube (10), of the tubular element (14) is bendable in the direction of the inner wall of the first tube.

3. A device of claim 1 wherein the tool (34) comprises two segments (36, 38) axially displaceable within the opening (12) of the first tube (10) one relative to the other and disposable in the opening, the segment (36) comprising the projecting protrusion (42) comprises a cylindrical basic body segment (44) and the second segment has a sickle-shape in cross section whose concave surface in the contact region with the first segment is adapted to the outer geometry thereof.

4. A device of claim 1 wherein the projecting protrusion (42) has a cylinder shape with an underside (46) extending obliquely in the direction of the basic body segment (44) of the first segment (36).

5. A device of claim 1 wherein the underside (46) of the radially projecting protrusion (42) of the first segment (36) conforms in segments to an outer surface of a truncated cone.

6. A device of claim 1 wherein the radially projecting protrusion (42) changes on the outer wall side flush into the basic body segment (44) in the contact region with the second segment (38).

7. A device of claim 1 wherein the tool (34) is rotatable about the longitudinal axis of the tool.

8. A device of claim 1 wherein the first segment (36) is a shaft with a projecting cam as the radially projecting protrusion (42) and the first segment penetrates a cylindrical reception (40) from which extends the second segment (38).

9. A device of claim 1 wherein the reception (40) and the second segment (38) form a unit.

10. A method for connecting a first tube with a tubular element within an opening of the first tube comprising
   a) introducing the tubular element into the opening of the first tube to an extent that an end segment of the tubular element extends within the first tube,
   b) introducing a first segment, comprising a radially projecting protrusion, of a tool through the tubular element into the interior of the tube to an extent that the radially projecting segment extends between the outer free margin of the tubular element and the inner wall, extending opposite the opening, of the first tube,
   c) axially displacing a second segment of the tool along the outside of the first segment for positioning the second segment within the tubular element in the region of the opening of the tube with the first and the second segment having in the region of the opening an effective cross section which is adapted to the tubular element with respect to the cross section in the region of the opening,
   d) pulling back the first segment along the second segment in the direction of the opening of the tube with the simultaneous regional bending of the margin segment, extending within the first tube, of the tubular element,
   e) displacing of the first segment in the direction of the inner wall, opposing the opening, of the opening and rotating the first and second segment for orienting the radially projecting protrusion of the first segment onto a further region to be bent of the margin segment extending within the first tube, of the tubular element and repeating the previously described method step d),
   f) pulling out, first, the second segment and, then, the first segment after the force-fit connection of the tubular element with the tube.

* * * * *